(12) United States Patent
Masuya (10) Patent No.: US 7,234,577 B2
(45) Date of Patent: Jun. 26, 2007

(54) TORQUE CONVERTER

(75) Inventor: Kouichi Masuya, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 171 days.

(21) Appl. No.: 11/036,355

(22) Filed: Jan. 18, 2005

(65) Prior Publication Data

US 2005/0155831 A1 Jul. 21, 2005

(30) Foreign Application Priority Data

Jan. 19, 2004 (JP) .............................. 2004-010259

(51) Int. Cl.
*F16H 45/02* (2006.01)
(52) U.S. Cl. ...................... 192/3.29; 192/3.3
(58) Field of Classification Search ............. None
See application file for complete search history.

(56) References Cited

U.S. PATENT DOCUMENTS

| | | | | |
|---|---|---|---|---|
| 3,001,415 A | * | 9/1961 | Smirl | 477/95 |
| 3,817,357 A | * | 6/1974 | Mori et al. | 192/3.33 |
| 4,535,652 A | * | 8/1985 | Nishikawa et al. | 477/62 |
| 4,951,788 A | * | 8/1990 | Martin | 192/3.3 |
| 5,330,038 A | * | 7/1994 | Haka | 192/3.29 |
| 5,598,906 A | * | 2/1997 | Ishiguro et al. | 192/3.3 |
| 5,799,763 A | * | 9/1998 | Dehrmann | 192/3.29 |
| 5,964,329 A | * | 10/1999 | Kawaguchi et al. | 192/3.3 |
| 6,419,059 B1 | * | 7/2002 | Nobu et al. | 192/3.3 |
| 6,478,101 B1 | | 11/2002 | Taniguchi et al. | |
| 7,114,604 B2 | | 10/2006 | Masuya | |
| 2005/0133328 A1 | * | 6/2005 | Masuya | 192/3.3 |

FOREIGN PATENT DOCUMENTS

| | | | |
|---|---|---|---|
| JP | 03051575 A | * | 3/1991 |
| JP | 2001-163071 | | 6/2001 |
| JP | 2003-63264 | | 3/2003 |

OTHER PUBLICATIONS

Copending U.S. Appl. No. 11/013,915, filed Dec. 17, 2004 entitled Torque Converter.

* cited by examiner

*Primary Examiner*—Richard M. Lorence
(74) *Attorney, Agent, or Firm*—Smith, Gambrell & Russell LLP (57) ABSTRACT

A torque converter, which can prevent an oil pressure required for shifting a lock-up clutch from being made high, is provided. A converter chamber is formed between an outside circular-plate portion of a front cover and an impeller shell. A lock-up clutch constituted by a drive plate and a driven plate is accommodated in a clutch chamber. A lock-up piston is attached to the front cover so as to be movable axially, and partitions the converter chamber and the clutch chamber. In engaging the lock-up clutch, the pressure in the clutch chamber is made lower than that in the converter chamber; and in releasing engagement of the lock-up clutch, operating oil having approximately the same pressure is supplied into the converter chamber and the clutch chamber.

20 Claims, 6 Drawing Sheets

TORQUE CONVERTER

BACKGROUND OF THE INVENTION

The present invention relates to a torque converter with a lock-up clutch.

The torque converter is a power transmission device comprising an impeller shell attached to a front cover, i.e., to a cover of the torque converter connected to an engine-output shaft and is provided with a pump impeller, and a turbine runner, which opposes to the pump impeller and is connected to a main shaft, wherein an engine output is amplified and transmitted to the main shaft that is an output shaft of the torque converter. The torque converter transmits the engine output by utilizing an operating oil as power transmission means, so that a power transmission loss due to a slip of a fluid is inevitable. Therefore, in a region where a rotational difference between the pump impeller and the turbine runner is small, the engine output is directly transmitted to the main shaft by actuating the lock-up clutch.

An ordinary lock-up clutch is provided with a clutch plate connected to the main shaft, thereby directly transmitting the engine output to the main shaft by engaging the clutch plate with the front cover. An operation of the clutch plate is controlled by a differential pressure between the operating oil supplied to a converter chamber which is formed between the clutch plate and the turbine runner, and the operating oil supplied to a clutch chamber formed between the clutch plate and the front cover. That is, in order to release the engagement between the clutch plate and the front cover and free the lock-up clutch, the operating oil a higher pressure than that of an interior of the converter chamber is supplied as a releasing oil pressure to the clutch chamber. When the higher releasing oil pressure than the oil pressure in the converter chamber is provided to the clutch chamber, the clutch plate permanently connected to the front cover is released and the operating oil in the clutch chamber flows into the converter chamber. Since the operating oil is constantly supplied to the converter chamber, the clutch plate is engaged with the front cover due to the oil pressure in the converter chamber if a supply of the operating oil to the clutch chamber is stopped.

As such a lock-up clutch, there is used a multi-plate clutch in which a plurality of the clutch plates are disposed between a clutch drum provided to the front cover and a clutch hub connected to the main shaft (e.g., see Patent Document 1 (Japanese Patent Laid-open No. 2001-163071) and Patent Document 2 (Japanese Patent Laid-open No. 2003-63264)). Each lock-up clutch disclosed in Patent Documents 1 and 2 has a piston for shifting, from a fastening state of engaging the multi-plate clutch and directly connecting the engine output to the main shaft, to a release state of releasing the engagement and for shifting vice versa, and an oil-pressure chamber for fastening is formed between the piston and the front cover. By employing such a multi-plate clutch, since the outer diameter of the clutch plate can be reduced, the lock-up clutch can be easily made compact and therefore a power generating motor constituting a hybrid system can be provided in an empty space obtained by downsizing.

However, if an oil-pressure chamber for an engagement is formed between a piston and a front cover, an oil pressure of a converter chamber is applied to the piston in a clutch-release direction. Therefore, in order to drive the piston against the oil pressure of the converter chamber, which is applied in the release direction, at a time of fastening the clutch, a higher pressure of an operating oil than that of an interior of the converter chamber is required to be supplied to the oil-pressure chamber for fastening. Thus, since the oil pressure for engaging the clutch must be made higher than the oil pressure supplied to the converter chamber, a burden imposed on the oil pump is increased and this is not preferred for improving transmission efficiency. Therefore, a fuel consumption of the engine cannot be reduced. Further, if the diameter of the lock-up piston is made small in order to downsize the lock-up clutch, a pressure receiving area is reduced, so that the oil pressure for an engagement must be made higher. Additionally, if a multi-plate clutch is disposed comparatively away from the main shaft and the diameter of the lock-up piston is enlarged in order to ensure a pressure receiving area, the lock-up clutch is accordingly enlarged in size.

SUMMARY OF THE INVENTION

An object of the present invention is to provide a torque converter which can reduce the highest oil pressure required for lock-up and to shift the lock-up clutch at a pressure lower than the oil pressure supplied to the converter chamber.

Another object of the present invention is to provide the torque converter which can easily perform shift control of the lock-up clutch.

The torque converter according to the present invention, which has an impeller shell provided with a pump impeller and driven by an engine-output shaft, and a turbine runner opposing to the pump impeller and connected to a main shaft, an engine output being amplified and transmitted to the main shaft, comprises: a front cover having an inside circular-plate portion to which the engine-output shaft is attached, a tubular drum portion extending axially from the inside circular-plate portion toward the pump impeller, and an outside circular-plate portion extending radially from the drum portion and forming a converter chamber with the impeller shell; a lock-up clutch constituted by a drive plate attached to the drum portion and a driven plate attached to a clutch hub connected to the main shaft; a lock-up piston attached to the front cover so as to be movable axially, and partitioning a clutch chamber accommodating the lock-up clutch and the converter chamber; and a pressure regulation means for supplying operating oil having approximately the same pressure as that of an interior of the clutch chamber at a time of releasing engagement of the lock-up clutch, and for making a pressure in the clutch chamber lower than that in the converter chamber at a time of engaging the lock-up clutch.

The torque converter according to the present invention further comprises an electromagnetic valve, which is connected to a clutch oil channel communicating with the clutch chamber and is shifted between a release position at which the operating oil having approximately the same pressure as that in the converter chamber is supplied to the clutch chamber and a fastening position at which the operating oil in the clutch chamber is discharged.

In the torque converter according to the present invention, an elastic body, abutting on the lock-up piston and exerting a biasing force in a direction of releasing fastening of the lock-up clutch, is provided to the drum portion.

According to the present invention, the lock-up clutch is fastened by making the pressure of the clutch chamber lower than that of the interior of the converter chamber, and the fastening of the lock-up clutch is released by supplying the operating oil having approximately the same pressure to the clutch chamber and the converter chamber. Therefore, the oil pressure, which is required for shifting the lock-up clutch, can be prevented from being made high.

According to the present invention, since the lock-up piston which partitions the clutch chamber and the converter chamber is provided, the operating oil does not flow between the clutch chamber and the converter chamber and therefore a responsiveness of the lock-up piston can be enhanced.

According to the present invention, since the pressure of the operating oil applied to the lock-up clutch can be controlled by simple pressure regulation means, a shift control of the lock-up clutch can be easily performed.

According to the present invention, since an elastic body, which exerts a biasing force on the lock-up piston in a direction of releasing the fastening of the lock-up clutch, is provided on the drum portion of the front cover, the fastening of the lock-up clutch can be securely released by merely supplying the operating oil having approximately the same pressure to the clutch chamber and the converter chamber.

DESCRIPTION OF THE PREFERRED EMBODIMENTS

Figure 1:
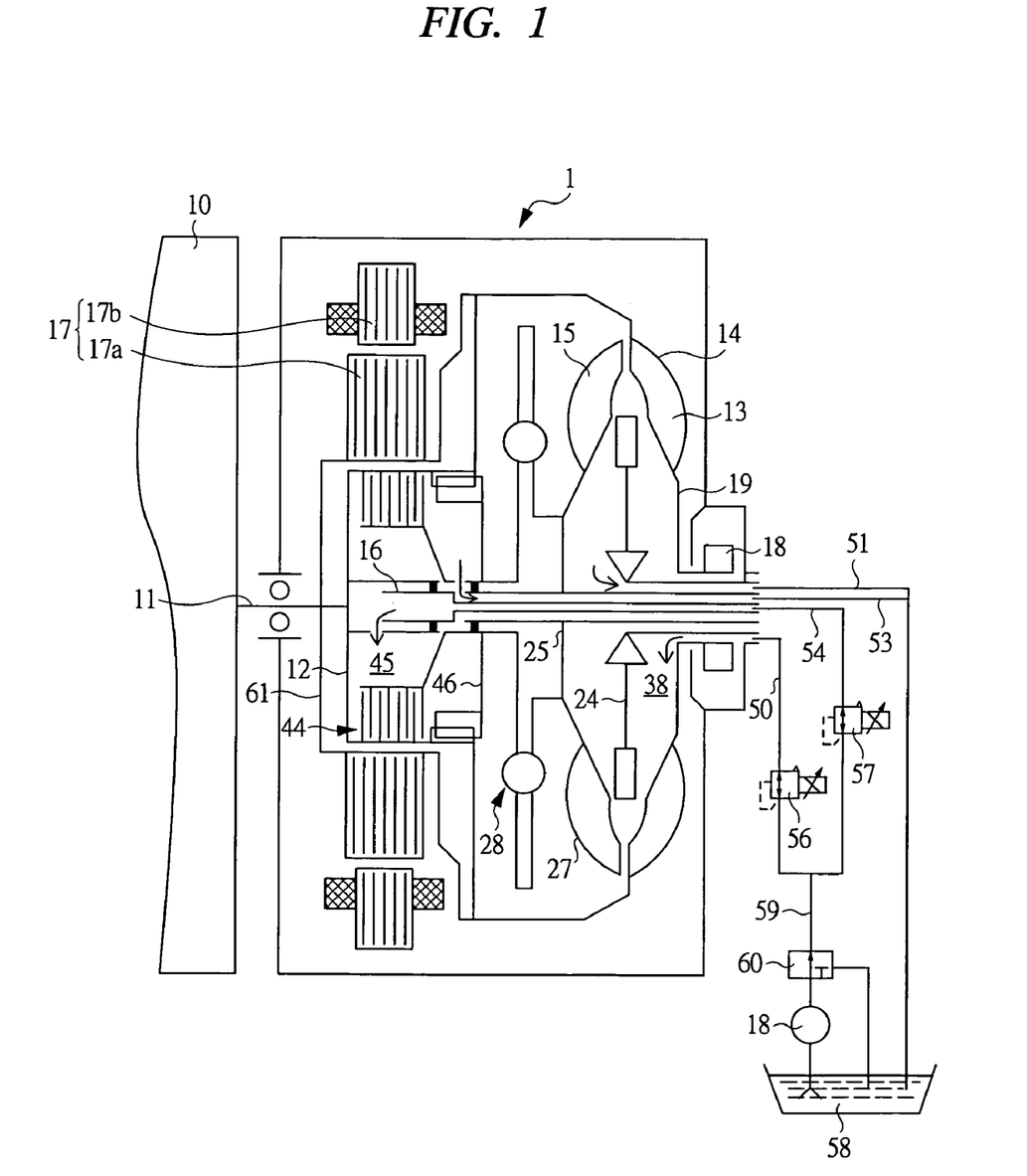
FIG. 1 is a schematic view showing an entire structure of a torque converter according to an example of the present invention.

Hereinafter, embodiments of the present invention will be detailed on the basis of drawings. FIG. 1 is a schematic view showing an entire structure of a torque converter according to an embodiment of the present invention.

As shown in FIG. 1, a torque converter 1 has a front cover 12 connected to an output shaft 11 that is a crankshaft of an engine 10, wherein an impeller shell 14 provided with a pump impeller 13 is attached to the front cover 12. A turbine runner 15 is disposed so as to oppose to the pump impeller 13, and the turbine runner 15 is connected to a main shaft 16 which is an output shaft of the torque converter 1. The engine output is amplified by the torque converter 1 and is transmitted to the main shaft 16.

A generator motor 17 is connected to the output shaft 11, and the generator motor 17 has a rotor 17a and a stator 17b and can perform the followings. That is, by actuating the motor as an assist motor when a vehicle imposes a load on the engine 10 at a time of start and/or acceleration, a driving force thereof is supplemented; by actuating the motor as an electric generator when a slight load in which efficiency of the engine 10 is low is applied, a battery is charged; and by a regenerative braking at a time of braking and/or running downhill, an energy recovery is made.

An impeller hub 19, of which one end is connected to the impeller shell 14 and the other end is connected to an oil pump 18, is disposed on an outer periphery of a main shaft 16 so as to be rotatable relative to the main shaft 16, so that the oil pump 18 for supplying an oil to the torque converter 1 is driven by the rotation of the impeller hub 19.

Figure 2:
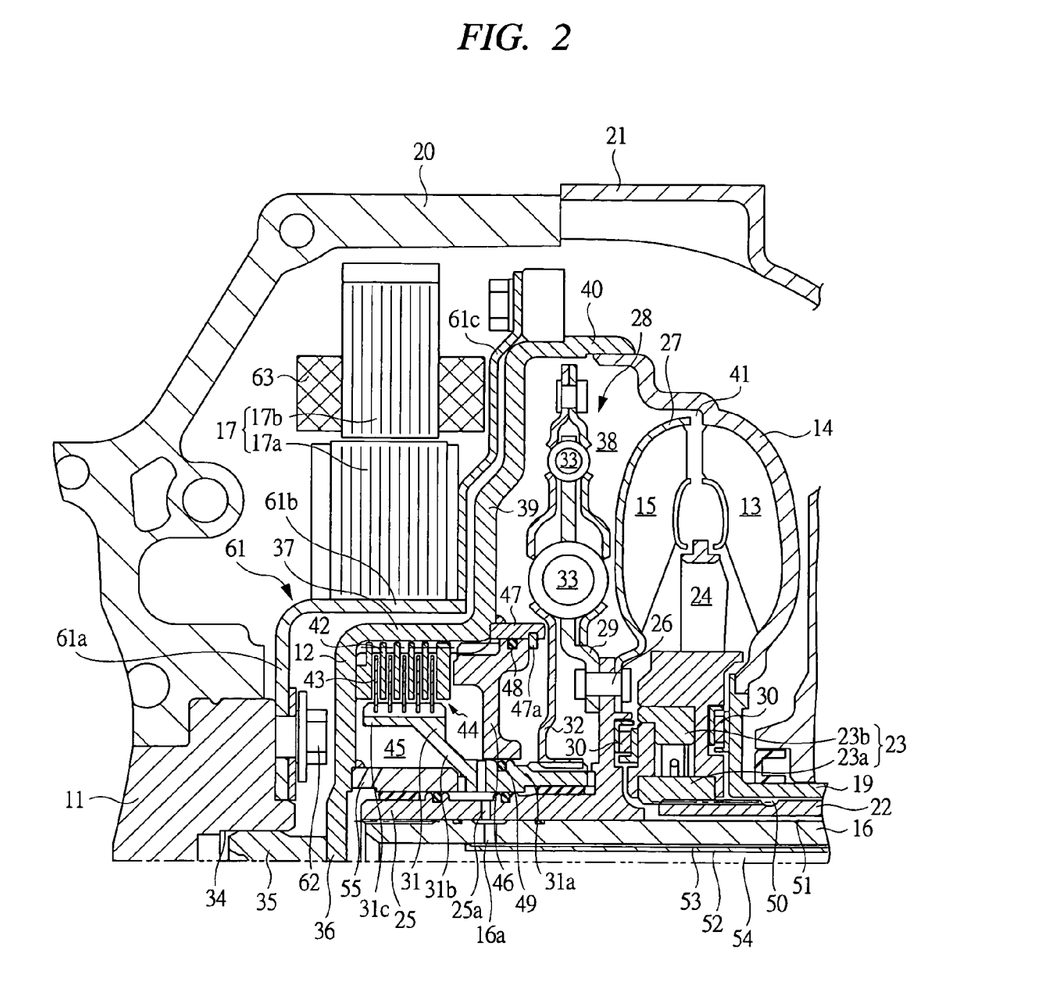
FIG. 2 is an enlarged sectional view of a principal portion of the torque converter according to an embodiment of the present invention.

FIG. 2 is an enlarged sectional view of a principal portion of the torque converter 1 according to an embodiment of the present invention. As shown in FIG. 2, a motor housing 20, which pivotally supports the engine-output shaft 11 and accommodates the power generating motor 17, is assembled to a converter housing 21 that pivotally supports the main shaft 16 and accommodates the torque converter 1. A stator shaft 22, which is disposed between the main shaft 16 and the impeller hub 19, is fixed to the converter housing 21, and an inner race 23a of a one-way clutch 23 is through a connected spline to the stator shaft 22, and a stator 24 is disposed at an outer race 23b of the one-way clutch 23.

A hollow turbine hub 25 is by the connected spline to an end and an outer periphery of the main shaft 16, and the turbine hub 25 rotates integrally with the main shaft 16. A runner shell 27 of the turbine runner 15 and a spring seat 29 of a lock-up damper 28 are connected to a flange portion of the turbine hub 25 by a rivet 26. A thrust bearing 30 is disposed between the one-way clutch 23 and the impeller hub 19 and between the one-way clutch 23 and the flange of the turbine hub 25, so that the torque transmitted to the runner shell 27 and the lock-up damper 28 is not transmitted to the main shaft 16 via the turbine hub 25.

The lock-up damper 28 has the spring seat 29 connected to the turbine hub 25, a spring seat 32 connected to a clutch hub 31, and a plurality of torsion springs 33 disposed in a circumferential direction and connected between the spring seats 29 and 32. The clutch hub 31 has a tubular portion 31a fitted to the turbine hub 25, and the spring seat 32 is fixed to the tubular portion 31a. The clutch hub 31 also has a disk portion 31b extending from the tubular portion 31a in an outer-radial direction, and a drum portion 31c extending from the disk portion 31b toward the engine-output shaft 11.

The front cover 12 has: an inside circular-plate portion 36 to which a shaft portion 35 attached to an attachment hole 34 formed in the engine-output shaft 11 is fixed; a tubular drum portion 37 extending axially from an outer periphery portion of the inside circular-plate portion 36 toward the pump impeller 13; an outside circular-plate portion 39 extending radially from the drum portion 37 and forming a converter chamber 38 along with the impeller shell 14, wherein an outside cylindrical-plate portion 40 extending toward the impellor shell 14 and connected to the impeller shell 14 is provided to a tip of the outside circular-plate portion 39. Accordingly, when the engine 10 is driven, the engine output is transmitted to the impeller shell 14 via the front cover 12. The operating oil flows into the converter chamber 38 through a clearance 41 formed between an outer edge of the impeller shell 14 and the outer edge of the runner shell 27.

The drum portion 37 of the front cover 12 opposes to a drum portion 31c of the clutch hub 31, and a plurality of drive plates 42 disposed inside the drum portion 37 and a plurality of driven plates 43 disposed outside the drum portion 31c are alternately stacked (or laminated), whereby the plates 42 and 43 constitute a lock-up clutch 44. The lock-up clutch 44 is accommodated in a clutch chamber 45 surrounded by the inside circular-plate portion 36 and the drum portion 37. Thus, the plates 42 and 43 constituting the lock-up clutch 44 form a multiple disc clutch, and can ensure a sufficient pressure receiving area. Therefore, an increase in a power transmission capacity can be achieved, and the torque of the engine 10 and the generator motor 17 can be transmitted with an excellent controllability.

A lock-up piston 46 is attached to the front cover 12 so as to be movable axially, and the clutch chamber 45 and the converter chamber 38 are partitioned by the lock-up piston 46. An engagement member 47 extending in an arrangement direction of the turbine runner 15 is welded on the inside of the front cover 12, and an abutment portion 47a is provided at a predetermined position of the engagement member 47 so as to protrude therefrom, and the lock-up piston 46 can move until it abuts on the abutment portion 47a. A seal member 48 contacting with the engagement member 47 is attached to an outer circumferential groove of the lock-up piston 46, and an inner circumferential surface of the lock-up piston 46 contacts with a seal member 49 attached to the clutch hub 31. That is, the operating oil does not flow mutually into the clutch chamber 45 and the converter chamber 38.

In the converter chamber 38, a converter oil channel 50 formed between the impeller hub 19 and the stator shaft 22 communicates with a converter oil channel 51 formed between the stator shaft 22 and the main shaft 16, and these two converter oil channels 50 and 51 constitute a supplying/discharging path of the operating oil to/from the converter chamber 38. A tubular fluid-channel forming member 52 extending axially is assembled into a hole of the main shaft 16, and clutch oil channels 53 and 54 are formed in the main shaft 16 by the fluid-channel forming member 52. Among these, the clutch oil channel 53 communicates with the clutch chamber 45 via communication holes 16a and 25a which are formed respectively in the main shaft 16 and the turbine hub 25, and the clutch oil channel 54 formed inside the fluid-channel forming member 52 communicates with the clutch chamber 45 via a communication hole 55, whereby these two clutch oil channels 53 and 54 constitute the supplying/discharging path of the operating oil to/from the clutch chamber 45. The operating oil supplied into the converter chamber 38 lubricates and cools members in the converter chamber 38 and is also used as a torque transmission medium. However, the oil flow into the clutch chamber 45 is blocked by the above-described lock-up piston 46.

An actuation of the lock-up piston 46 is controlled by pressure regulating means which regulates the oil pressure of the operating oil supplied to the converter chamber 38 and the oil pressure of the operating oil supplied to the clutch chamber 45. As shown in FIG. 1, the converter oil channel 50 and the clutch oil channel 54 are connected to pressure control valves 56 and 57, respectively, so that the operating oil having been pressure-regulated is supplied to each of the converter chamber 38 and the clutch chamber 45. The illustrated pressure control valves 56 and 57 are proportional electromagnetic-pressure-control valves, each of which can steplessly (or continuously) vary an open state thereof, whereby, for example, the above valves can supply constant oil pressure by compensating for a temperature variation of the oil pressure. The operating oil, which is accumulated in an oil pan 58 and pumped up by the above-described oil pump 18, flows into each of the converter oil channel 50 and the clutch oil channel 54 after a flow rate thereof is regulated by a flow-rate control valve 60 connected to a common oil channel 59. Each of the converter oil channel 51 and the clutch oil channel 53 is connected to the oil pan 58, thereby constituting a circulation path of the operating oil which circulates in the torque converter 1. By use of the pressure regulating means, the operating oil having approximately the same pressure can be supplied to the clutch chamber 45 and the converter chamber 38, and the pressure in the clutch chamber 45 can be reduced below the pressure in the converter chamber 38.

In the case shown in FIG. 2, the lock-up clutch 44 comprises the multiple disc clutch with a small diameter of a wet type, whereby the radial dimension thereof is reduced. Therefore, some space can be obtained in an outer periphery of the drum portion 37 of the front cover 12, so that the generator motor 17 is attached in the space.

A rotor supporting member 61 is fixed to the engine-output shaft 11. The rotor supporting member 61 comprises: a first circular plate portion 61a fastened to the engine-output shaft 11 by a bolt 62; a cylindrical portion 61b extending along the drum portion 37 of the front cover 12; and a second circular plate portion 61c extending along the outside circular-plate portion 39 of the front cover 12, wherein the second portion 61c is fastened to an outside cylindrical portion 40 of the front cover 12. Therefore, the rotor supporting member 61 and the front cover 12 are integrally driven to rotate by the engine-output shaft 11.

The rotor 17a having permanent magnets is fixed to the cylindrical portion 61b, and the stator 17b around which a coil 63 is wound is fixed to an inside-wall surface of the motor housing 20 so as to form a predetermined clearance with the rotor 17a. If it requires to be shown by a figure, the generator motor 17 is set to have approximately the same axial dimension as that of the drum portion 37. Since the lock-up clutch 44 and the power generating motor 17 have approximately the same axial position and are disposed inside and outside with respect to the radial direction, the axial dimension of the power transmission device can be downsized.

The power transmission path of the torque converter 1 according to the present invention will next be explained. The engine output of the engine-output shaft 11 is transmitted to the front cover 12 via the shaft portion 35 and the rotor supporting member 61. When the generator motor 17 is actuated as an assist motor, the motor torque is transmitted as auxiliary torque for the engine output to the front cover 12 via the rotor supporting member 61. When the torque transmitted to the front cover 12 is transmitted to the impeller shell 14 and the pump impeller 13 is rotated, the oil filling the converter chamber 38 circulates between the turbine runner 15 and the pump impeller 13 via the stator 24, whereby the turbine runner 15 is rotated. The rotation of the turbine runner 15 is transmitted to the main shaft 16 via the turbine hub 25. At this time, if an amplification operation of the torque occurs between the pump impeller 13 and the turbine runner 15, a reaction force caused by the operation is imposed on the stator 24 and the rotation of the stator 24 is blocked by the one-way clutch 23. The oil pump 18 is driven by the torque transmitted to the impeller hub 19 connected to the impeller shell 14.

Figure 3A:
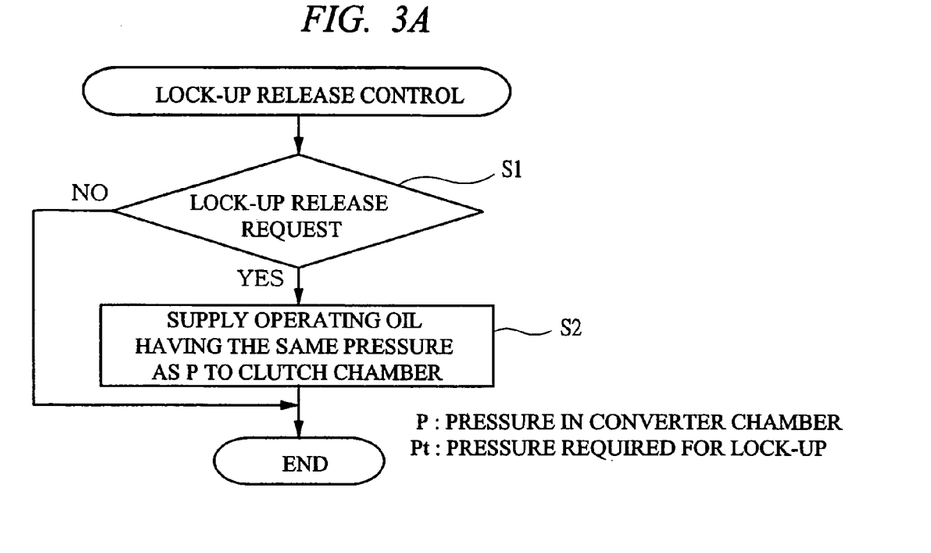
FIG. 3A is an explanatory view showing a procedure for a lock-up release control.

Thus, when the power is transmitted by using the torque amplification operation by the torque converter 1, release of the fastening state of the lock-up clutch 44 is required. FIG. 3A is an explanatory diagram showing a procedure for lock-up release control. As shown in the figure, in the torque converter, whether a lock-up release request is made is determined (step S1), and if the release request is made, the pressure control valves 56 and 57 constituting the pressure regulating means are controlled and the operating oil having the same pressure as that of the side of the converter chamber 38 is supplied to the clutch chamber 45 (step S2). If the release request is not made, the release control is completed as it is. If the operating oil having an approximately same pressure is supplied to the clutch chamber 45 and the converter chamber 38, a differential pressure is not generated between the oil pressure in the clutch chamber 45 and the oil pressure in the converter chamber 38, so that the lock-up piston 46 is not actuated. At this time, the operating oil supplied to the clutch chamber 45 flows into the space between the drive plates 42 and the driven plates 43 and a slippage is caused between the drive plates 42 and the driven plates 43 and thereby both plates are separated from one another, so that the fastening thereof is released.

As a speed ratio of the torque converter 1 approaches 1 in accordance with an increase of the number of engine revolutions, the amplification operation of torque is not exerted between the pump impeller 13 and the turbine runner 15. In this case, in order to avoid power transmission loss caused by the slippage of the operating oil, the engine output is directly transmitted to the main shaft 16 by fastening the lock-up clutch.

Figure 3B:
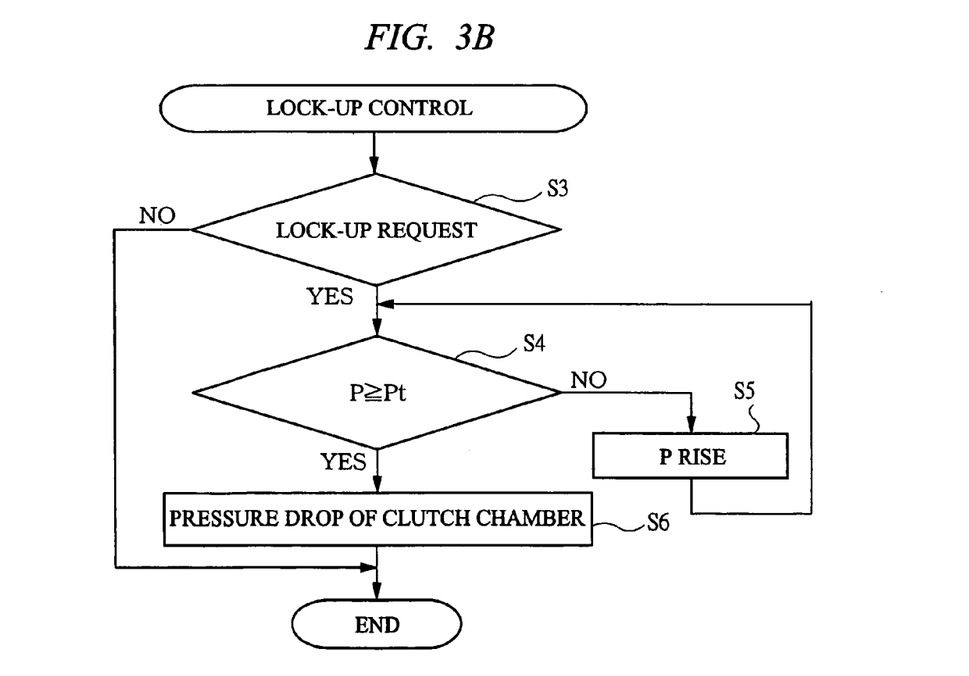
FIG. 3B is an explanatory view showing the procedure for the lock-up fastening control.

FIG. 3B is an explanatory diagram showing a procedure for a lock-up fastening control. As shown in the figure, whether a lock-up fastening request is made is determined (step S3), and if the fastening request is made, a comparison between the pressure P in the converter chamber 38 and the pressure Pt required for the lock-up fastening is made (step S4). The step 4 is required for the reason that there exists the case where the pressure P in the converter chamber 38 in accordance with a running condition is reduced up to a range in which an occurrence of a cavitation can be suppressed and where the pressure P in the converter chamber 38 is raised only at a time of the lock-up fastening. When it is determined in the step S4 that the pressure P is lower than the required pressure Pt, the pressure P in the converter chamber 38 is raised by controlling the pressure control valves 56 and 57 (step S5). When it is determined in the step S4 that the pressure P is equal to or more than the required pressure Pt, the pressure in the clutch chamber 45 is made lower than the pressure in the converter chamber by controlling the pressure control valves 56 and 57 (step S6). As a result, the lock-up piston 46, which is actuated by the differential pressure generated between the oil pressure in the clutch chamber 45 and the oil pressure in the converter chamber 38, moves toward a side of the low-pressure clutch chamber 45 and presses the lock-up clutch 44, whereby the lock-up clutch 44 is fastened.

Thus, according to the torque converter 1 of the present invention, the lock-up fastening can be performed by making the pressure in the clutch chamber 45 lower than that in the converter chamber 38, and the lock-up fastening can be released by supplying the operating oil having approximately the same pressure to the clutch chamber 45 and the converter chamber 38. That is, in a series of lock-up controls, it is not required to make the pressure in the clutch chamber 45 higher than that in the converter chamber 38, and the oil pressure required for shifting the lock-up clutch 44 can be prevented from being made higher. In addition, since the structure in which the clutch chamber 45 and the converter chamber 38 are partitioned is adopted, the operating oil does not flow between the clutch chamber 45 and the converter chamber 38, whereby a responsiveness of the lock-up piston 46 can be enhanced.

If the lock-up clutch 44 is completely fastened, the front cover 12 and the clutch hub 31 are rotated integrally. Accordingly, the torque of the engine-output shaft 11 is transmitted from the front cover 12 to the clutch hub 31 via the lock-up clutch 44, and then is transmitted from the lock-up damper 28 to the main shaft 16 via the turbine hub 25, whereby the power transmission loss between the pump impeller 13 and the turbine runner 15 can be avoided. The variation in the engine torque is absorbed by the lock-up damper 28. Note that in accordance with the running condition, the drive plates 42 and the driven plates 43 may be fastened in slip states.

Figure 4:
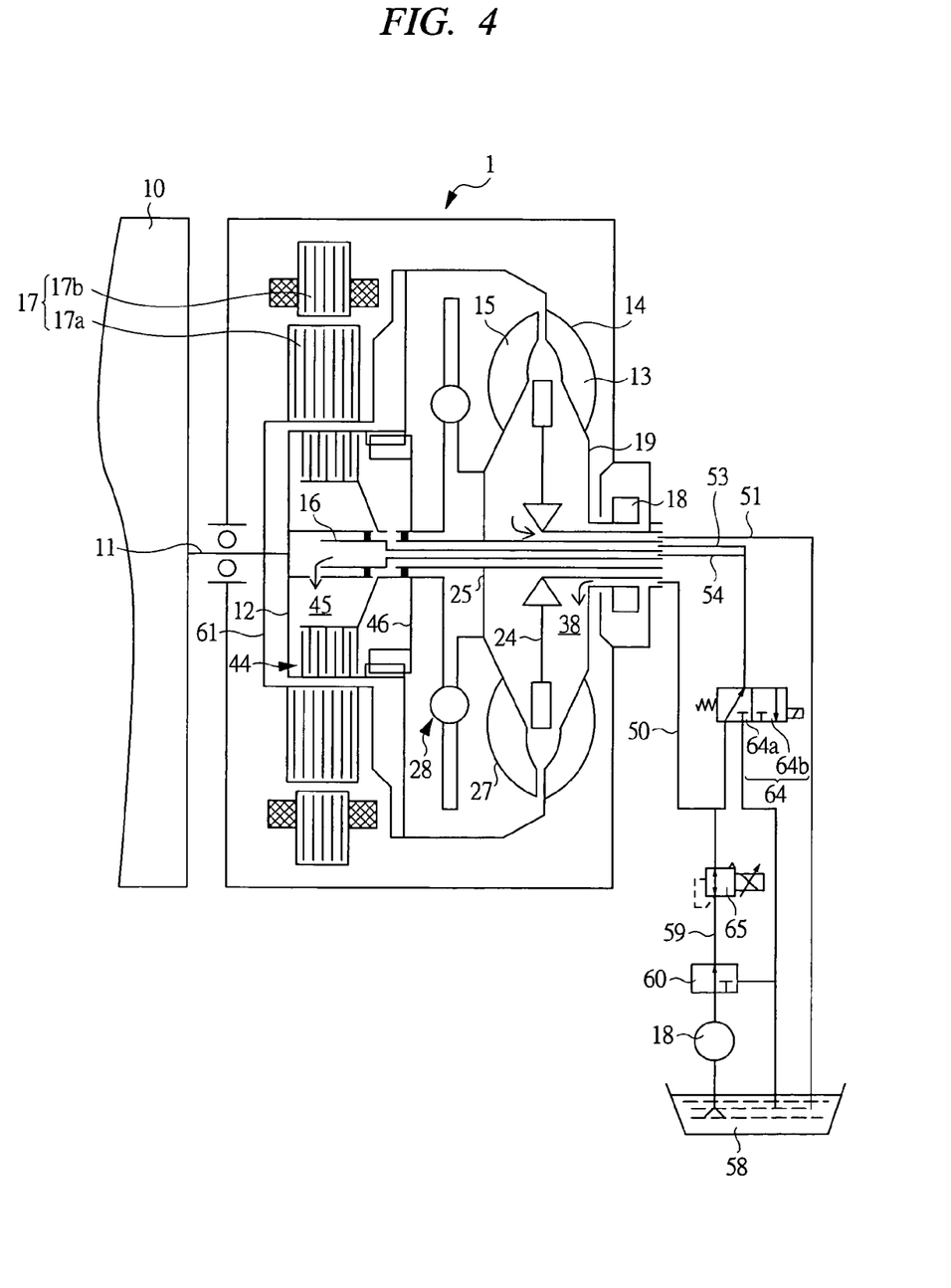
FIG. 4 is a schematic view showing the entire structure of the torque converter according to another embodiment of the present invention.

FIG. 4 is a schematic drawing showing the entire structure of the torque converter according to another embodiment of the present invention. Note that the same members as those shown in FIG. 1 are denoted by the same reference numeral. As shown in the figure, an electromagnetic valve 64, having a release position 64a at which the operating oil having approximately the same pressure as that of the interior of the converter chamber 38 is supplied to the clutch chamber 45 and a fastening position 64b at which the operating oil in the clutch chamber 45 is discharged, is connected to the clutch oil channel 54. The electromagnetic valve 64 is connected to the common oil channel 59 which communicates with the converter oil channel 50, and a pressure control valve 65 and a flow-rate control valve 60 are connected to the common oil channel 59. That is, the operating oil, of which flow rate is regulated by the flow-rate control valve 60 and the pressure is regulated by the pressure control valve 65, flows into each of the converter oil channel 50 and the clutch oil channel 54 to which the electromagnetic valve 64 is connected.

In the case shown in FIG. 4, when the operating oil in the clutch chamber 45 is discharged to the oil pan 58, the pressure in the clutch chamber 45 is made lower than that in the converter chamber 38 to fasten the lock-up clutch 44. That is, when the lock-up release request is made, the electromagnetic valve 64 is set at the release position 64a and the operating oil having approximately the same pressure is supplied to the converter chamber 38 and the clutch chamber 45 via the common oil channel 59. As a result, the differential pressure exerted on the lock-up piston 46 is eliminated, and the fastening of the lock-up clutch 44 is released. Meanwhile, when the lock-up fastening request is made and if the electromagnetic valve 64 is set at the fastening position 64b, the clutch chamber 45 becomes in a state of communicating with the oil pan 58. As the result, since the operating oil in the clutch chamber 45 is discharged, the pressure in the clutch chamber 45 is lower than that in the converter chamber 38 and thereby the differential pressure occurs. The lock-up piston 46 actuated by the differential pressure presses the lock-up clutch 44, whereby the lock-up clutch 44 is fastened.

Thus, according to the torque converter 1 of the present invention, since the pressure of the operating oil exerted on the lock-up clutch 44 can be controlled by discharging the operating oil in the clutch chamber 45, a shift control of the lock-up clutch 44 can be performed easily.

Figure 5:
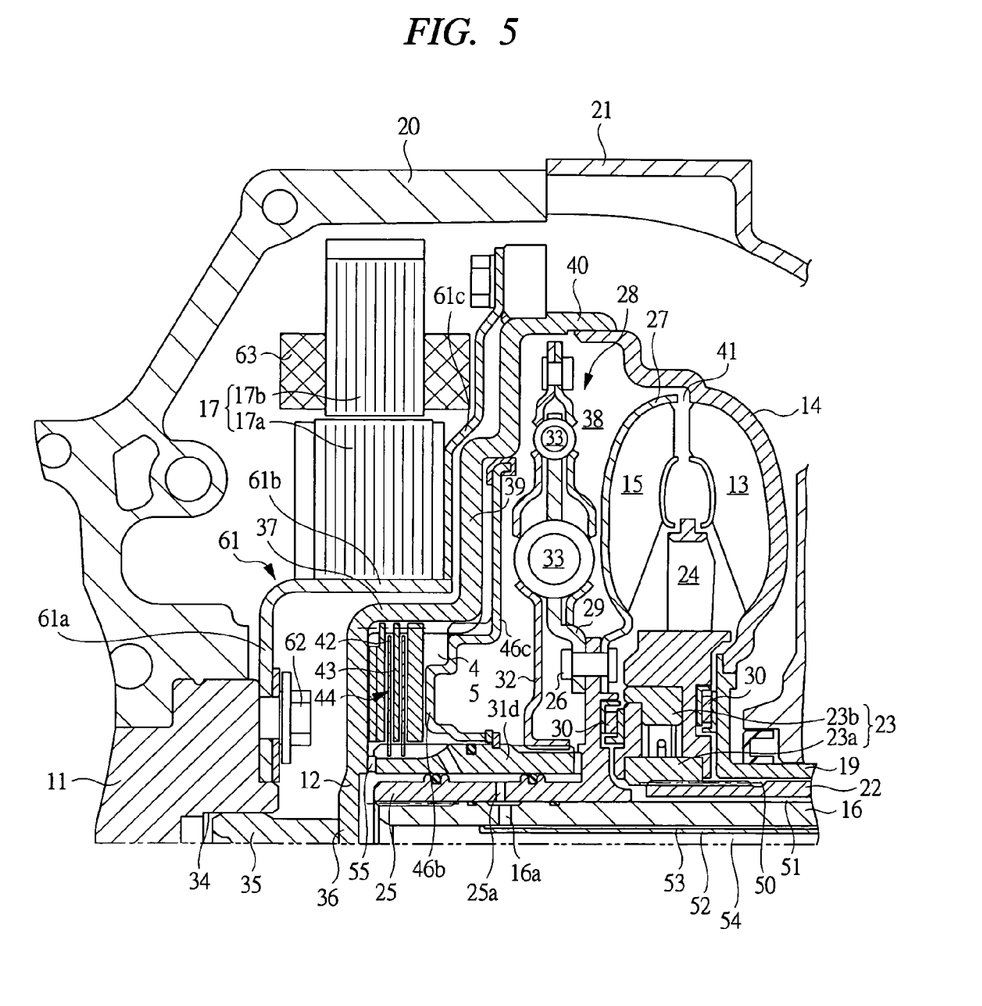
FIG. 5 is an enlarged sectional view of the principal portion of the torque converter according to another embodiment of the present invention.

FIG. 5 is an enlarged sectional view of the principal portion of a torque converter according to another embodiment of the present invention, and the same members as those shown in FIG. 2 are denoted by the same reference numeral. In the case shown in the FIG. 5, a lock-up piston 46b has a large-diameter pressure receiving portion 46c which extends in an outer-radial direction along the outside circular-plate portion 39 of the front cover 12. Accordingly, since the pressure receiving area of the lock-up piston 46b is enlarged, the thrust force exerted on the lock-up clutch 44 can be enhanced. In addition, by enhancing the thrust force of the lock-up clutch 44, as shown in the Figure, even if the number of attached drive plates 42 and the number of the attached driven plates 43 are respectively reduced, the sufficient fastening force can be ensured. Therefore, the number of members can be reduced and the lock-up clutch can be downsized. Also, the clutch hub 31d may be formed into a cylindrical shape without providing the disk portion 31b extending in the outer-radial direction as shown in FIG.

2. In this case, the inner diameter of the lock-up clutch 44 may be reduced and the radial dimension thereof may be set larger.

Figure 6:
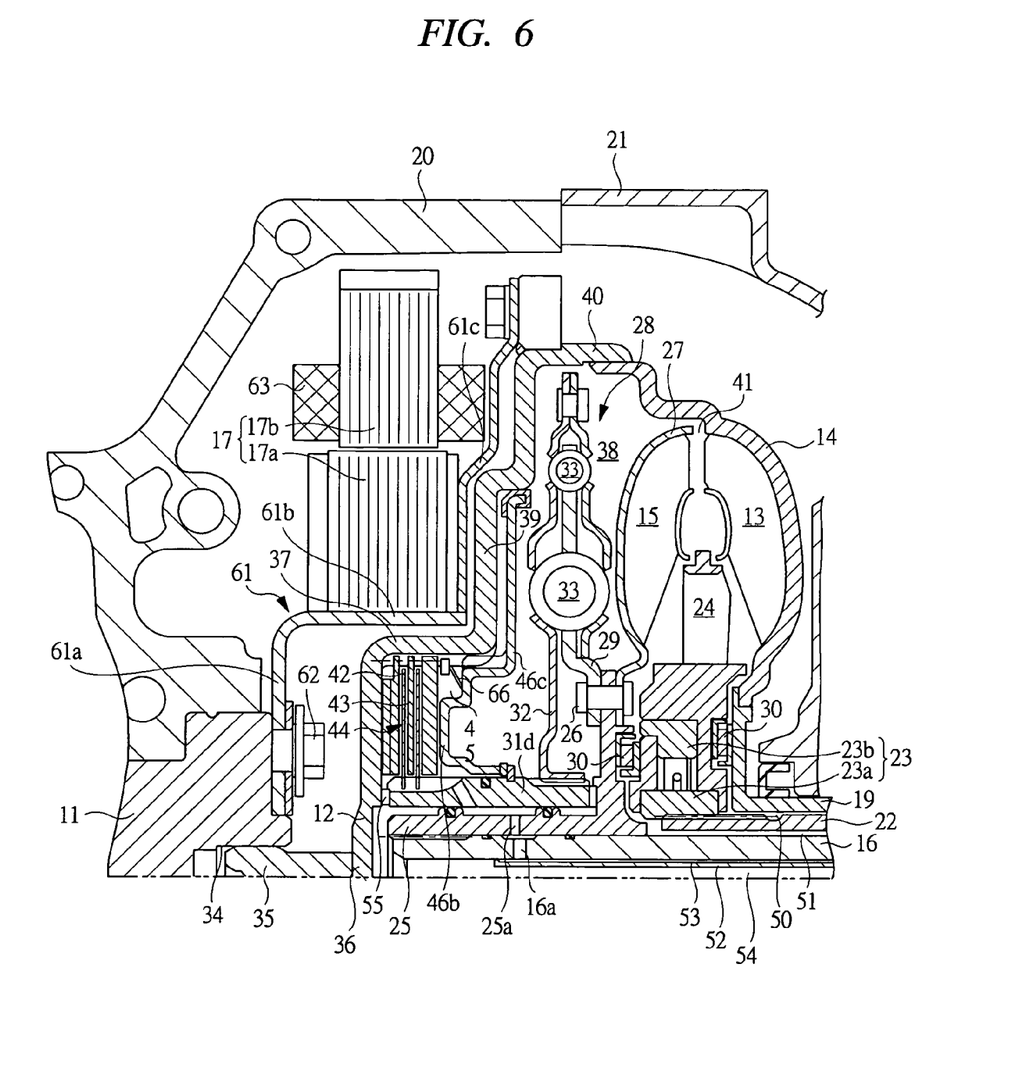
FIG. 6 is an enlarged sectional view of the principal portion of the torque converter according to another embodiment of the present invention.

FIG. 6 is an enlarged sectional view of the principal portion of the torque converter according to another embodiment of the present invention, and the same members as those shown in FIG. 5 are denoted by the same reference numeral. In the case shown in the FIG. 6, an elastic body 66, which abuts on the lock-up piston 46b and exerts a biasing force in a releasing direction of the lock-up clutch 44, is provided to the drum portion 37 of the front cover 12. When the operating oil having approximately the same pressure is supplied to the clutch chamber 45 and the converter chamber 38, the lock-up piston 46b is not actuated by the differential pressure. However, even in this case, the lock-up piston 46b is actuated in the releasing direction of the lock-up clutch 44 due to the biasing force of the above-described elastic body 66. Therefore, the lock-up piston 46b and the lock-up clutch 44 does not interfere with each other, and the fastening of the lock-up clutch 44 can be securely released.

The present invention is not limited to the above-described embodiments, and can be variously modified and altered without departing from the gist thereof. For example, the above-described lock-up clutch 44 is a multi-plate clutch, but may be replaced with a single-plate clutch. In the embodiments shown in the Figure, the power generating motor 17 is attached to the outside of the drum portion 37 of the front cover 12 and the torque converter 1 is mounted on a hybrid vehicle. However, the torque converter of the present invention may be employed in a vehicle on which the power generator 17 is not mounted.

The entire disclosure of a Japanese Patent Application No. 2004-010259, filed on Jan. 19, 2004 including specification, claims, drawings and summary, on which the Convention priority of the present application is based, is incorporated herein by reference in its entirety.

What is claimed is:

1. A torque converter having an impeller shell provided with a pump impeller and driven by an engine-output shaft, and a turbine runner opposing to said pump impeller and connected to a main shaft, the torque converter comprising:
   a front cover with an inside circular-plate portion attached to said engine-output shaft, a tubular drum portion extending axially from said inside circular-plate portion toward said pump impeller, and an outside circular-plate portion extending radially from said drum portion and forming a converter chamber with said impeller shell;
   a lock-up clutch constituted by a drive plate attached to said drum portion and a driven plate attached to a clutch hub connected to said main shaft;
   a lock-up piston attached to said front cover so as to be movable axially, and partitioning a clutch chamber accommodating said lock-up clutch and said converter chamber;
   a generator motor provided at an outer periphery of said lock-up clutch; and
   pressure regulation means for supplying operating oil to said clutch chamber having approximately the same pressure as that to said converter chamber at a time of releasing engagement of said lock-up clutch, and for making a pressure in said clutch chamber lower than that in said converter chamber at a time of engaging said lock-up clutch.

2. The torque converter according to claim 1, wherein said pressure regulation means comprises an electromagnetic valve connected to a clutch oil channel communicating with said clutch chamber, and shifted between a release position where the operating oil having approximately the same pressure as that in said converter chamber is supplied to said clutch chamber and a fastening position where the operating oil in said clutch chamber is discharged.

3. The torque converter according to claim 1, further comprising:
   an elastic body attached to said drum portion for abutting on said lock-up piston and exerting a biasing force in a direction of releasing fastening of said lock-up clutch.

4. The torque converter according to claim 2, further comprising:
   an elastic body attached to said drum portion for abutting on said lock-up piston and exerting a biasing force in a direction of releasing fastening of said lock-up clutch.

5. The torque converter according to claim 1, wherein said lock-up piston has a large-diameter pressure receiving portion which extends in an outer-radial direction to radially overlap with said generator motor.

6. The torque converter according to claim 1, further comprising:
   a rotor supporting member fixed to said engine-output shaft;
   wherein said generator motor comprises a rotor and a stator, and said rotor is fixed to said rotor supporting member.

7. The torque converter according to claim 6, wherein said rotor supporting member comprises: a first circular plate portion fastened to said engine-output shaft; a cylindrical portion extending along said drum portion of said front cover; and a second circular-plate portion extending along said outside circular-plate portion of the front cover and being fastened to said outside cylindrical portion of said front cover, and said rotor is fixed to said cylindrical portion of said rotor supporting member.

8. The torque converter according to claim 6 wherein said rotor supporting member axially overlaps said drum portion.

9. The torque converter according to claim 1 wherein said generator motor axially overlaps said lock up clutch in extending about said drum portion.

10. The torque converter according to claim 1, wherein said generator motor has approximately the same axial dimension as that of said drum portion.

11. The torque converter according to claim 1, wherein said lock up clutch is received within said drum portion.

12. A torque converter having an impeller shell provided with a pump impeller and driven by an engine-output shaft, and a turbine runner opposing to said pump impeller and connected to a main shaft, the torque converter comprising:
   a front cover with an inside circular-plate portion attached to said engine-output shaft, a tubular drum portion extending axially from said inside circular-plate portion toward said pump impeller, and an outside circular-plate portion extending radially from said drum portion and forming a converter chamber with said impeller shell;
   a lock-up clutch constituted by a drive plate attached to said drum portion and a driven plate attached to a clutch hub connected to said main shaft;
   a lock-up piston attached to said front cover so as to be movable axially, and partitioning a clutch chamber accommodating said lock-up clutch and said converter chamber;
   a generator motor that axially overlaps said drum portion of said front cover;

pressure regulation means for supplying operating oil to said clutch chamber having approximately the same pressure as that to said converter chamber at a time of releasing engagement of said lock-up clutch, and for making a pressure in said clutch chamber lower than that in said converter chamber at a time of engaging said lock-up clutch.

13. The torque converter according to claim 12, wherein said pressure regulation means comprises an electromagnetic valve connected to a clutch oil channel communicating with said clutch chamber, and shifted between a release position where the operating oil, having approximately the same pressure as that in said converter chamber, is supplied to said clutch chamber, and a fastening position where the operating oil in said clutch chamber is discharged.

14. The torque converter according to claim 12, further comprising:
an elastic body attached to said drum portion for abutting on said lock-up piston and exerting a biasing force in a direction of releasing fastening of said lock-up clutch.

15. The torque converter according to claim 12, wherein said lock-up piston has a large-diameter pressure receiving portion which extends in an outer-radial direction to radially overlap with said generator motor.

16. The torque converter according to claim 12, further comprising:
a rotor supporting member fixed to said engine-output shaft;
wherein said generator motor having a rotor and a stator, and said rotor is fixed to said rotor supporting member.

17. The torque converter according to claim 16, wherein said rotor supporting member comprises a first circular plate portion fastened to said engine-output shaft; a cylindrical portion extending along said drum portion of said front cover; and a second circular-plate portion extending along said outside circular-plate portion of the front cover, and being fastened to said outside cylindrical portion of said front cover, and said rotor is fixed to said cylindrical portion of said rotor supporting member.

18. The torque converter according to claim 12, wherein said generator motor has approximately the same axial dimension as that of said drum portion.

19. The torque converter according to claim 12, wherein said lock up clutch is received within said drum portion.

20. A torque converter having an impeller shell provided with a pump impeller and driven by an engine-output shaft, and a turbine runner opposing to said pump impeller and connected to a main shaft, the torque converter comprising:
a front cover with an inside circular-plate portion attached to said engine-output shaft, a tubular drum portion extending axially from said inside circular-plate portion toward said pump impeller, and an outside circular-plate portion extending radially from said drum portion and forming a converter chamber with said impeller shell;
a lock-up clutch constituted by a drive plate attached to said drum portion and a driven plate attached to a clutch hub connected to said main shaft;
a lock-up piston attached to said front cover so as to be movable axially, and partitioning a clutch chamber accommodating said lock-up clutch and said converter chamber;
a clutch oil channel constitute a supplying path of the operating oil to said clutch chamber;
a converter oil channel constitute a supplying path of the operating oil to said converter chamber;
a pressure regulator valve that communicates with said clutch oil channel, said converter oil channel and an oil pan; and
wherein said pressure regulator valve has a release position for supplying approximately the same pressure operating oil to said clutch chamber and said converter chamber, and a fastening position for discharging the operating oil in said clutch chamber to said oil pan.

* * * * *